(12) United States Patent
Christianson et al.

(10) Patent No.: US 8,141,651 B1
(45) Date of Patent: Mar. 27, 2012

(54) THATCH RAKE WITH FLEXIBLE THATCHING ASSEMBLY

(75) Inventors: Michael J. Christianson, Bozeman, MT (US); Daniel Sereday, Bozeman, MT (US); Zack Connaughton, Everett, WA (US); Phillip Viveiros, Greensboro, NC (US)

(73) Assignee: Christianson International, Inc., Bozeman, MT (US)

( * ) Notice: Subject to any disclaimer, the term of this patent is extended or adjusted under 35 U.S.C. 154(b) by 0 days.

(21) Appl. No.: 13/029,241

(22) Filed: Feb. 17, 2011

(51) Int. Cl.
*A01B 45/00* (2006.01)
*A01B 45/02* (2006.01)

(52) U.S. Cl. .............. 172/21; 172/22; 56/364

(58) Field of Classification Search .......... 56/364, 56/400.2, 14.8, 16.4 R, 130, 164, 193, 365, 56/367, DIG. 12; 172/22, 12.4, 12.5, 27, 172/28, 540, 611, 21
See application file for complete search history.

(56) References Cited

U.S. PATENT DOCUMENTS

| | | | |
|---|---|---|---|
| 2,533,417 A * | 12/1950 | Barnes | 56/11.7 |
| 2,916,130 A | 12/1959 | Thorn | |
| 3,247,812 A | 4/1966 | Luciano et al. | |
| 4,223,742 A | 9/1980 | Stark | |
| 4,776,404 A * | 10/1988 | Rogers et al. | 172/21 |
| 4,965,993 A | 10/1990 | Butler et al. | |
| 5,038,868 A * | 8/1991 | Rinelli | 172/48 |
| 5,524,425 A * | 6/1996 | Gallazzini | 56/364 |
| 5,579,847 A * | 12/1996 | Postema | 172/22 |
| 5,690,179 A | 11/1997 | Dickson | |
| 5,822,959 A * | 10/1998 | Norton | 56/1 |
| 5,911,671 A * | 6/1999 | Heitstuman | 56/16.4 R |
| 6,393,814 B1 | 5/2002 | Gorey | |
| 6,854,255 B1 * | 2/2005 | Emerson | 56/330 |
| 6,902,010 B2 | 6/2005 | Shoup | |
| 6,915,728 B2 | 7/2005 | Renwick et al. | |

* cited by examiner

*Primary Examiner* — Arpad Fabian-Kovacs
(74) *Attorney, Agent, or Firm* — Antoinett M. Tease

(57) ABSTRACT

A thatch rake comprising a handle, a body assembly comprising two side plates, a belt drive system comprising first and second rotating pulley wheels, a motor, a flexible thatching assembly comprising two thatching rods, and a guide arm situated in between the two side plates. Each thatching rod is situated between a side plate and the guide arm. A universal joint is located between each side plate and a thatching rod and between each thatching rod and the guide arm. Each thatching rod comprises a plurality of outwardly extending tines. The guide arm has two ends and is pivotally attached to the body assembly on one end and attached to a center wheel on the other end.

10 Claims, 10 Drawing Sheets

THATCH RAKE WITH FLEXIBLE THATCHING ASSEMBLY

BACKGROUND OF THE INVENTION

1. Field of the Invention

The present invention relates generally to the field of lawn maintenance equipment, and more specifically, to a thatch rake with a flexible thatching assembly.

2. Description of the Related Art

The term "thatch" refers to a layer of dead grasses that prevents a lawn from receiving proper air, nutrients and hydration. Thatch rakes are lawn maintenance implements designed to remove accumulated thatch from a lawn. This removal process generally promotes denser grass and a vibrant lawn. Following are several reasons for removing thatch: (1) thatch catches rain water and prevents the rain from entering the soil to water the roots; (2) thatch catches the fertilizer that should go into the ground and to the roots; (3) over time, the new roots of the grass start growing in the thatch rather than in the soil; and (4) thatch can be a habitat for fungus and insects harmful to a lawn.

There are two basic methods available for dealing with thatch, one of which is to rake the lawn by hand using a thatch rake designed for this purpose. This procedure offers the optimum result but is impractical for larger lawns. Another method is to use a mechanized (gasoline engine-driven) thatch rake, commonly referred to as a "power rake." Most mechanized thatch rakes utilize steel flails to remove the thatch. Flails are destructive to the health of the lawn because they dig into the soil and shock the lawn; however, a flail might be preferred if a lawn has an extreme thatch problem. Some mechanized thatch rakes use tines rather than flails, and tines are gentler on the lawn, but these thatch rakes are ineffective on uneven ground because the tines can only operate on a single horizontal plane.

What is needed is a mechanized thatch rake that adequately removes thatch without placing undue stress upon a lawn. The ideal thatch rake would provide some accommodation for height differences (e.g., humps and depressions) in the terrain; in other words, it would be operable on uneven terrain and be capable of gently scratching the ground over both raised and lowered surfaces. The present invention, described more fully below, solves these problems by providing a thatch rake with a flexible thatching assembly that accommodates both rises and depressions in the ground. The present invention also includes an edge thatching attachment for thatching along fences or other borders.

BRIEF SUMMARY OF THE INVENTION

The present invention is a thatch rake comprising a handle; a body assembly comprising two side plates; a belt drive system comprising first and second rotating pulley wheels; a motor; a flexible thatching assembly comprising two thatching rods; and a guide arm situated in between the two side plates; wherein each thatching rod is situated between a side plate and the guide arm; wherein a universal joint is located between each side plate and a thatching rod and between each thatching rod and the guide arm; wherein each thatching rod comprises a plurality of outwardly extending tines; and wherein the guide arm has two ends and is pivotally attached to the body assembly on one end and attached to a center wheel on the other end.

In a preferred embodiment, the invention further comprises two outer wheels, each of which is situated inside of one of the two side plates and in front of a thatching rod. Preferably, the height of each outer wheel is adjustable by repositioning the outer wheel relative to the side plate. The height of the center wheel relative to the guide arm is preferably adjustable.

In a preferred embodiment, each thatching rod is at an angle of roughly one hundred eight degrees relative to the front end of the side plate and roughly seventy-two degrees relative to the front end of the guide arm. In an alternate embodiment, each thatching rod is at an angle in the range of ninety to one hundred thirty-five degrees relative to the front end of the side plate and in the range of forty-five to ninety degrees relative to the front end of the guide arm.

In a preferred embodiment, the second pulley wheel comprises an axle that passes through a bearing in one of the two side plates and is connected to the universal joint that is situated between the side plate through which the axle passes and the thatching rod that is situated between the guide arm and the side plate through which the axle passes. Preferably, the invention further comprising an edge thatching attachment situated outside of one of the two side plates and comprising a plurality of outwardly extending tines. The edge thatching attachment preferably further comprises a steel pipe that slides over a steel rod that extends through a bearing in the side plate outside of which the edge thatching attachment is situated and is connected to the universal joint that is situated between the side plate outside of which the edge thatching attachment is situated and the thatching rod that is situated between the guide arm and the side plate outside of which the edge thatching attachment is situated.

REFERENCE NUMBERS

Figure 1:
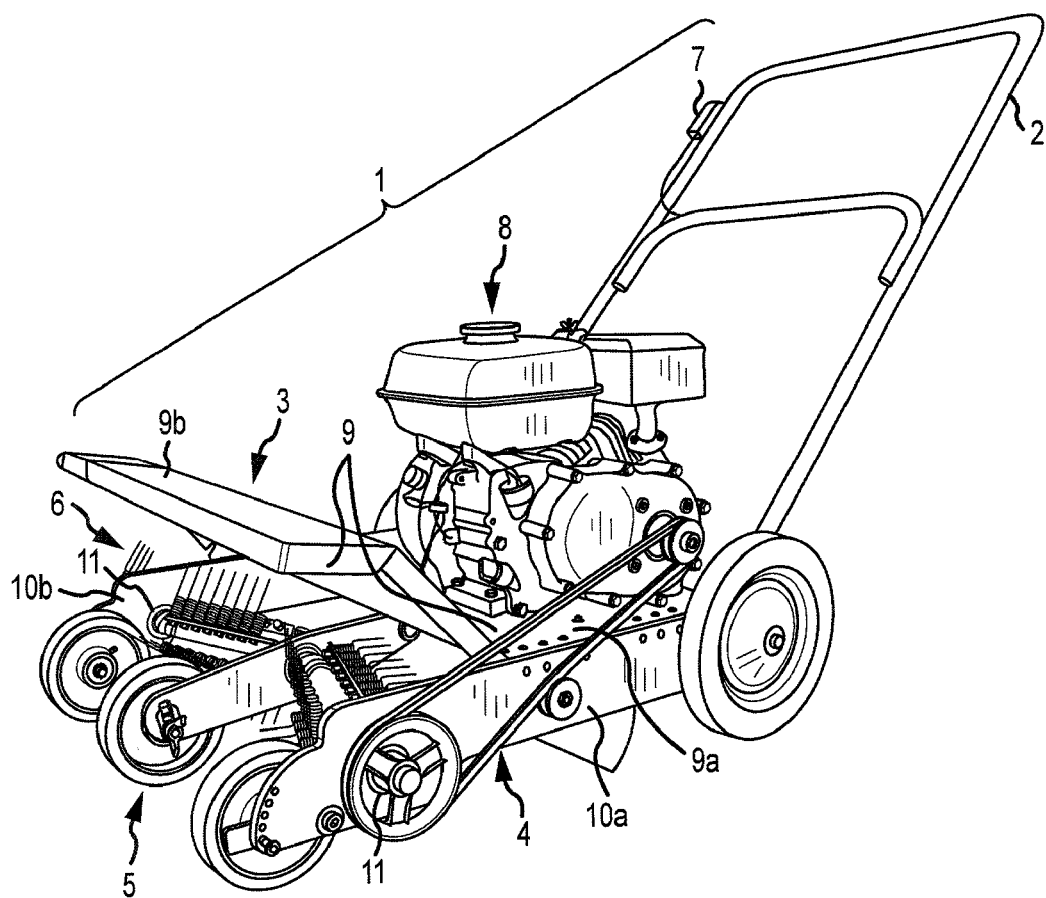
FIG. 1 is a perspective view of the present invention.

1 Thatch rake
2 Handle
3 Body assembly
4 Belt drive system
4a First rotating pulley wheel
4b Second rotating pulley wheel
4c Idler wheel
4d Belt
4e Axle (of second rotating pulley wheel)
5 Flexible thatching assembly
6 Edge thatching attachment
6a Edge thatching attachment cover
7a Throttle adjustment switch
7b Kill switch 8 Motor
9 Top plate (of body assembly)
9a Flat portion (of top plate)
9b Angled portion (of top plate)
10a First side plate
10b Second side plate
11 Bearing
12 Slot (in side panel)
13 Universal joint
14 Rear wheel
15 Rear guard
16 Thatching rod
17 Guide arm
18 Center wheel
19a First outer wheel
19b Second outer wheel
20 Spring tines
21 Steel plate
22a Steel rod
22b Steel pipe
23 First bolt/pin
24 Aperture (in side plate)
25 Connecting plate
26 Second bolt
27 Support bracket
28 Bolt (for connecting guide arm to support bracket)
29 First slot (in guide arm)
30 Second slot (in guide arm)
31 Nut
32 Bolt (for securing steel pipe to steel rod)

DETAILED DESCRIPTION OF INVENTION

FIG. 1 is a perspective view of the present invention. As shown in this figure, the thatch rake 1 comprises a handle 2, a body assembly 3, a belt drive system 4, a flexible thatching assembly 5, and an edge thatching attachment 6 (shown more clearly in FIG. 3). Attached to the handle are a throttle adjustment switch 7a and a kill switch 7b (see FIG. 4) for the motor 8, which is mounted on top of the top plate 9 of the body assembly 3. In a preferred embodiment, the motor is a Honda GX160 with a centrifugal clutch and a gear reduction. The top plate 9 comprises a flat portion 9a on which the motor 8 is mounted and an angled portion 9b that covers the flexible thatching assembly 5. The body assembly 3 further comprises two side plates 10a, 10b into which two bearings 11 are press fit.

Figure 2:
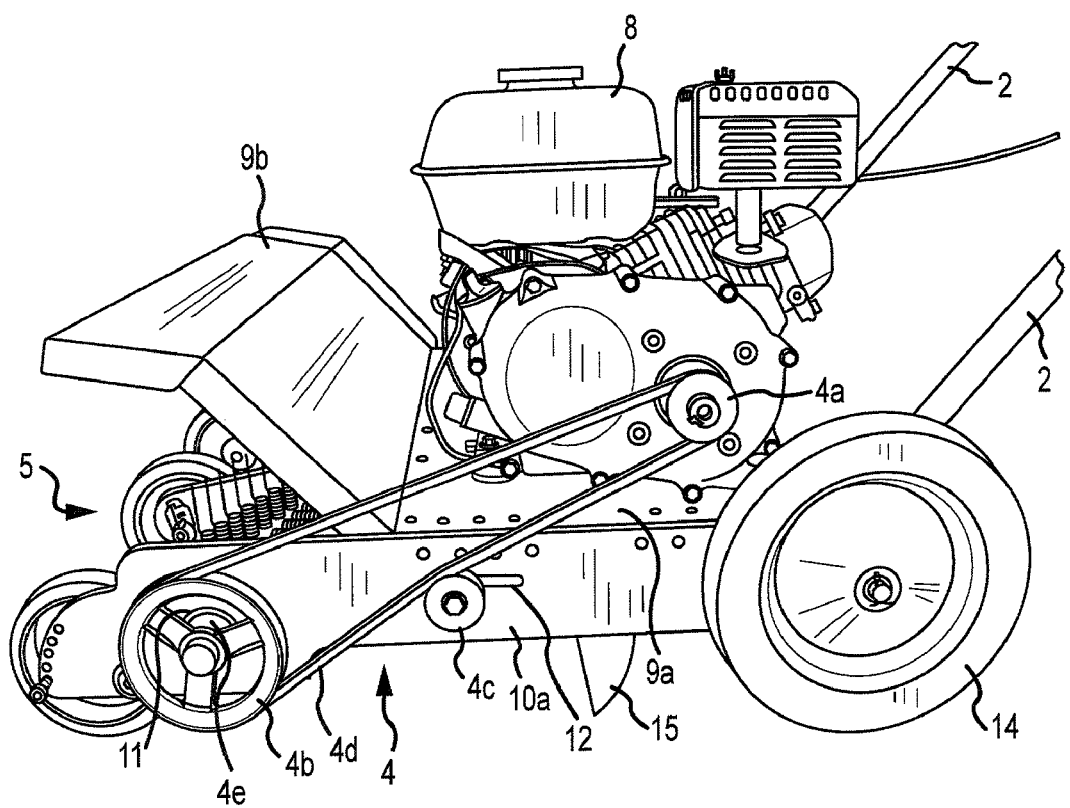
FIG. 2 is a first side view of the present invention.

FIG. 2 is a first side view of the present invention. This figure shows side plate 10a and the belt drive system 4 in greater detail than in FIG. 1. The belt drive system 4 comprises a first rotating pulley wheel 4a that is situated on the motor 8 and driven by the drive shaft (not shown) of the motor, a second rotating pulley wheel 4b that is situated just outside of the first side plate 10a, and an idler wheel 4c that is situated between the rotating pulley wheels 4a, 4b. A rubber belt 4d extends around both pulley wheels 4a, 4b and comes into contact with the idler wheel 4c. The axle (not shown) of the idler wheel 4c passes through a slot 12 in the first side plate 10a to allow the position of the idler wheel 4c to be adjusted to provide the desired tension on the belt 4d.

Figure 4:
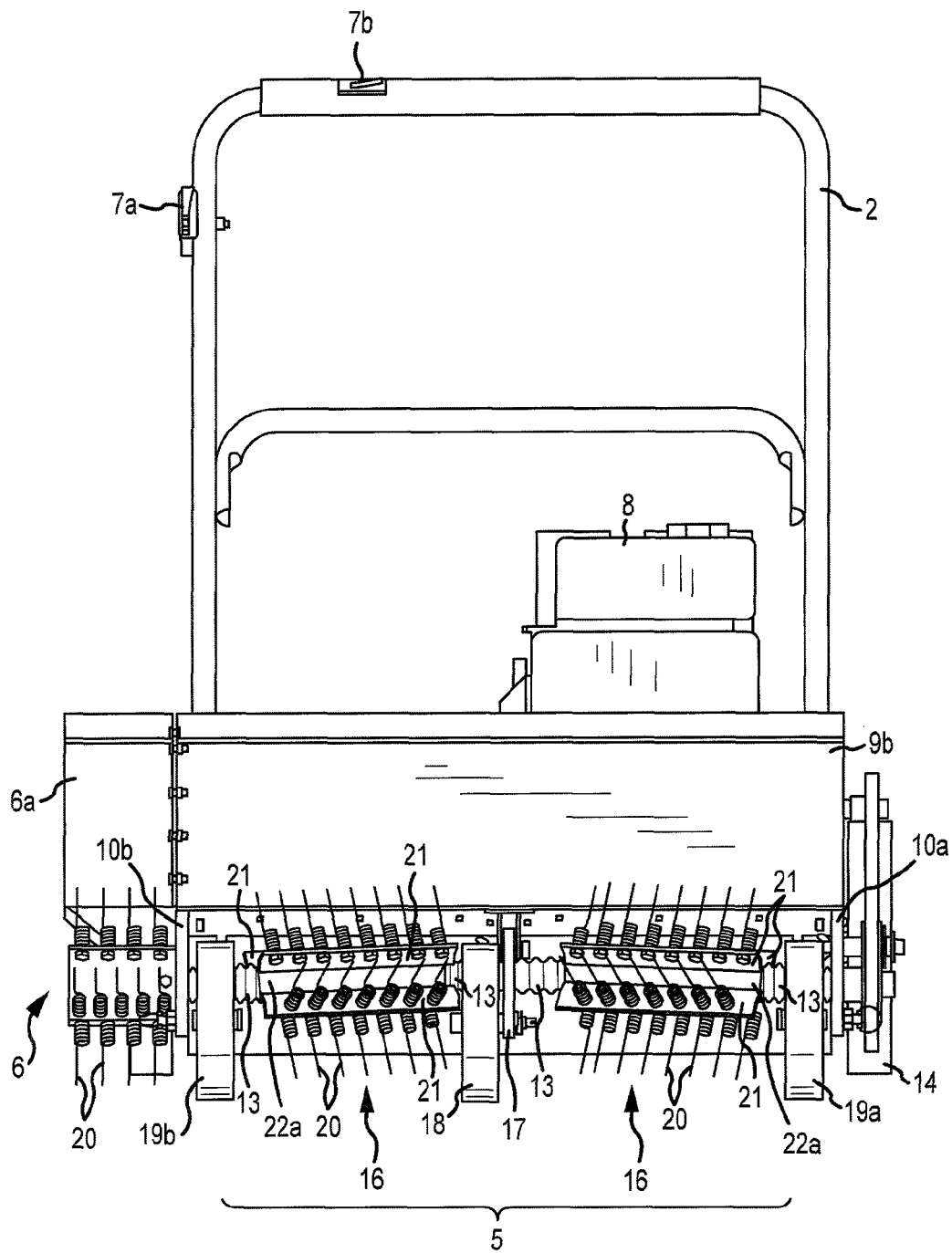
FIG. 4 is a front view of the present invention.

The axle 4e of the second rotating pulley wheel 4b is attached on one end to the rotating pulley wheel 4b, passes through the bearing 11 in the side plate 10a, and is connected on the other end to the universal joint 13 on the inside of the side plate 10a (see FIG. 4). As such, when the motor 8 causes the first rotating pulley wheel 4a to rotate, the belt 4d causes the second rotating pulley wheel 4b to rotate, and this in turn causes the universal joint 13 to rotate.

Figure 3:
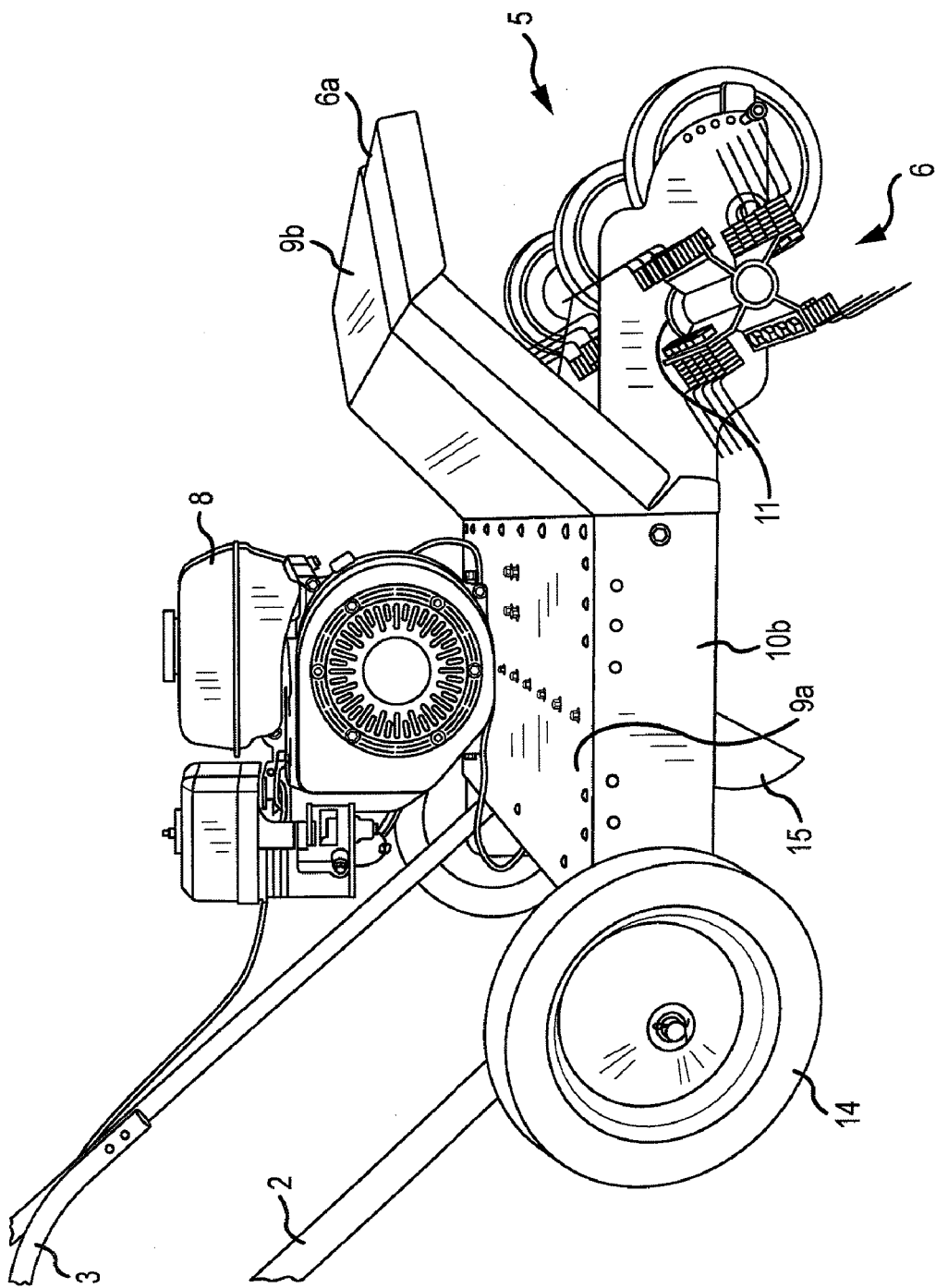
FIG. 3 is a second side view of the present invention.

As shown in FIGS. 2 and 3, two rear wheels 14 are attached to an axle (not shown) that extends through one of the two side plates 10a, 10b, and a rear guard 15 preferably extends downward from the underside of the top plate 9a to prevent debris from flying backward toward the operator.

FIG. 3 is a second side view of the present invention. This figure shows the edge thatching attachment 6 in greater detail. The edge thatching attachment 6 is preferably removable. An edge thatching attachment cover 6a similar to the angled portion 9b of the top plate 9 of the body assembly 3 preferably extends over the edge thatching attachment 6. The edge thatching attachment 6 is constructed similarly to the two thatching rods 16 of the flexible thatching assembly 5 and is shown and described in greater detail in connection with FIG. 5.

FIG. 4 is a front view of the present invention. This figure shows the flexible thatching assembly 5 in greater detail. The flexible thatching assembly 5 comprises two thatching rods 16, each of which is situated between the two side plates 10a, 10b. A guide arm 17 is located between the two thatching rods 16. As shown in FIGS. 7-10, the guide arm 17 is attached on one end to a pivot point on the underside of the flat portion 9a of the top plate 9 and on the other end to the center wheel 18. Two outer wheels 19a, 19b are situated just inside of the side plates 10a, 10b and in front of the thatching rods 16.

Each thatching rod 16 is preferably comprised of a plurality of spring tines 20 that are bolted to four angled steel plates 21, which are in turn welded to steel rods 22a. Each steel rod 22a is connected to a universal joint 13 at both ends of the steel rod 22a. The universal joints 13 allow the thatching rods 16 to rotate, thereby causing the spring tines 20 to make contact with the ground. As shown in FIG. 1, the two thatching rods 16 are preferably angled backward relative to the side plates 10a, 10b to prevent the thatching rods 16 from binding. In a preferred embodiment, the thatching rods 16 are angled at roughly one hundred eight degrees (108°) relative to the front end of the side plates 10a, 10b (or seventy-two degrees (72°) relative to the front end of the guide arm 17). In order to function properly, the angle of the thatching rods 16 relative to the front end of the side plates 10a, 10b is in the range of ninety degrees (90°) to one hundred thirty-five (135°) degrees (or forty-five degrees (45°) to ninety degrees (90°) relative to the front end of the guide arm 17).

Figure 5:
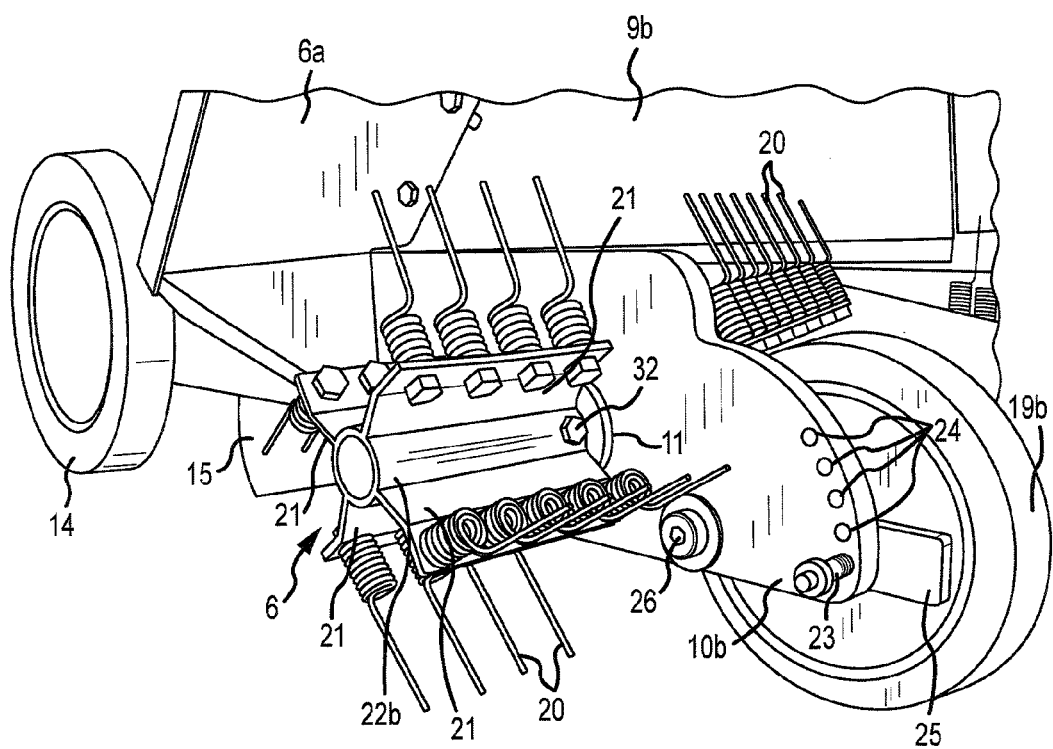
FIG. 5 is a detail perspective view of the edge thatching attachment of the present invention.

FIG. 5 is a detail perspective view of the edge thatching attachment of the present invention. As shown in this figure, like the thatching rods 16 of the flexible thatching assembly 5, the edge thatching attachment 6 comprises a plurality of spring tines 20 that are bolted to four angled steel plates 21, which are in turn welded to a steel pipe 22b. The steel pipe 22b slides over a steel rod (not shown) that extends through the bearing 11 in the second side plate 10b and is connected to the universal joint 13 on the inside of the second side plate 10b. (The steel pipe 22b is secured to the steel rod (not shown) with a bolt 32 or other fastener. This design allows the edge thatching attachment 6 to be easily removed by loosening the bolt 32 and sliding the steel pipe 22b off of the steel rod.) Thus, when the thatching rods 16 rotate, the edge thatching attachment 6 also rotates. The edge thatching attachment 6 lies outside of the second side plate 10b and can be used to remove thatch along fences, buildings, etc. The edge thatching attachment 6 is preferably not at an angle relative to the second side plate 10b.

Figure 6:
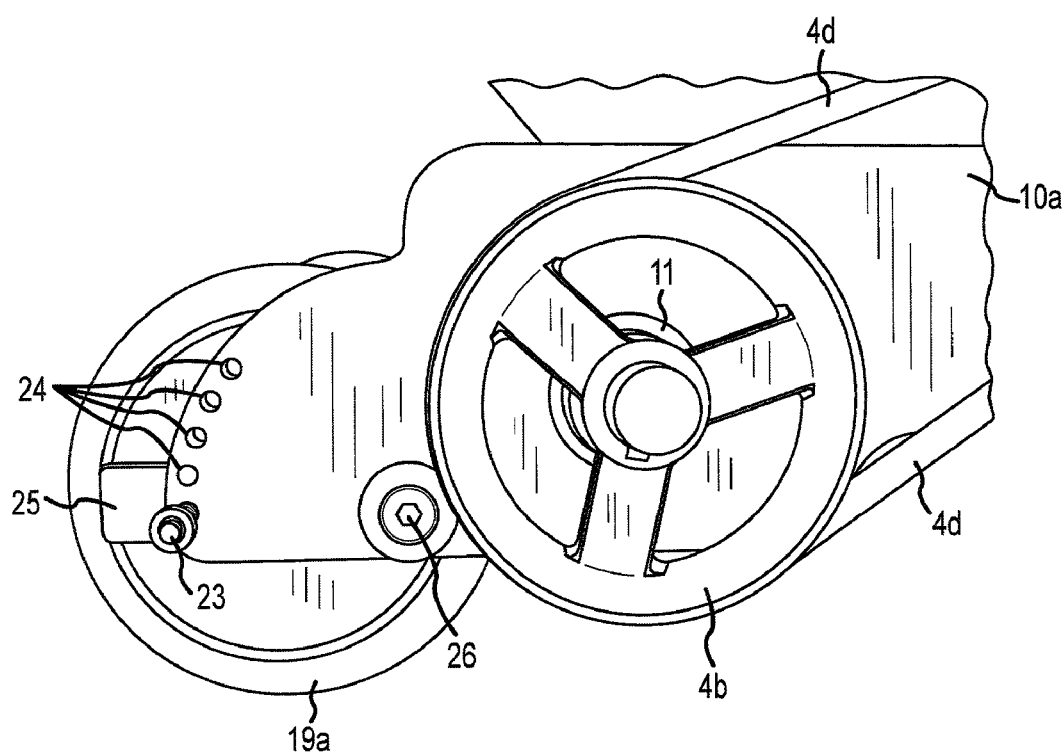
FIG. 6 is a detail view of the outer wheel height adjustment mechanism of the present invention.

FIG. 6 is a detail view of the outer wheel height adjustment mechanism of the present invention. In a preferred embodiment, the height of the outer wheel 19a can be adjusted by removing a first bolt (or pin) 23 that extends through one of several apertures 24 in the first side plate 10a and placing it through another one of the apertures 24. The first bolt 23 extends through an aperture 24 in the first side plate 10a and also through a connecting plate 25 on the inside of the first side plate 10a. This connecting plate 25 is anchored at one end by the first bolt 23 and at its other end by a second bolt 26. The axle (not shown) of the first outer wheel 19a is attached to the connecting plate 25 between the first and second bolts 23, 26 (the same is true of the second outer wheel 19b).

In the position shown in FIG. 6, the outer wheel 19a is in its lowest position. The height of the outer wheel 19a could be raised by placing the first bolt 23 in any one of the other apertures 24. This same height adjustment mechanism applies to the second outer wheel 19b, as shown in FIG. 5.

Figure 7:
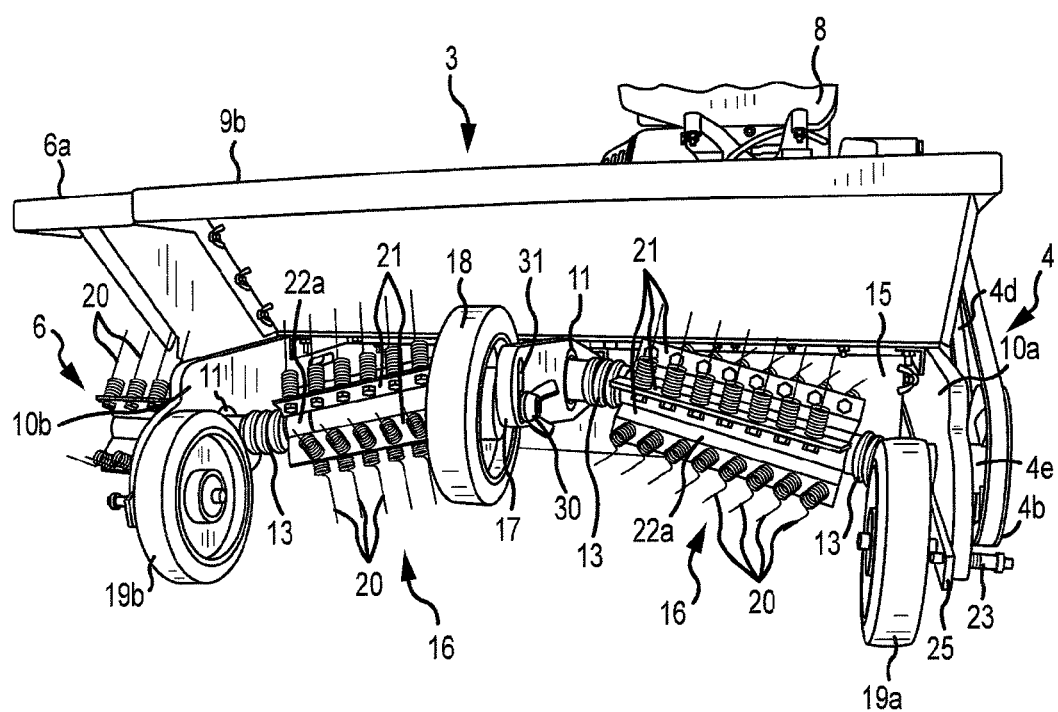
FIG. 7 is a detail perspective view of the flexible thatching assembly of the present invention with the center wheel extended upward relative to the two outer wheels.
Figure 8:
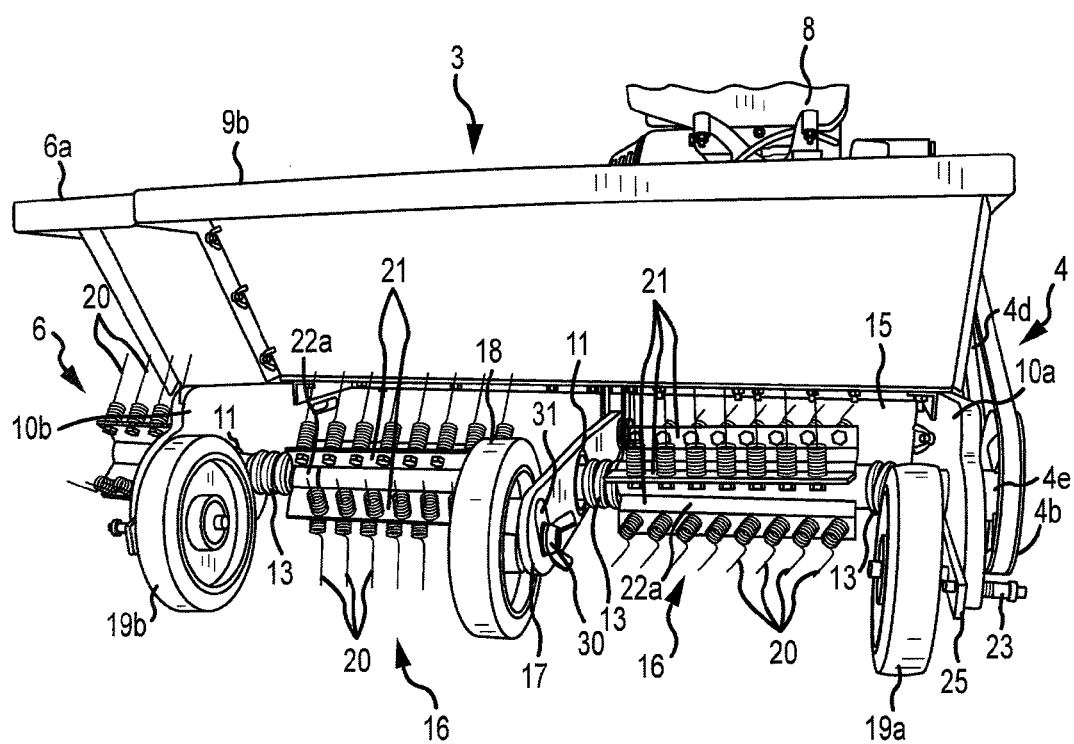
FIG. 8 is a detail perspective view of the flexible thatching assembly of the present invention with the center wheel on roughly the same horizontal plane as the two outer wheels.
Figure 9:
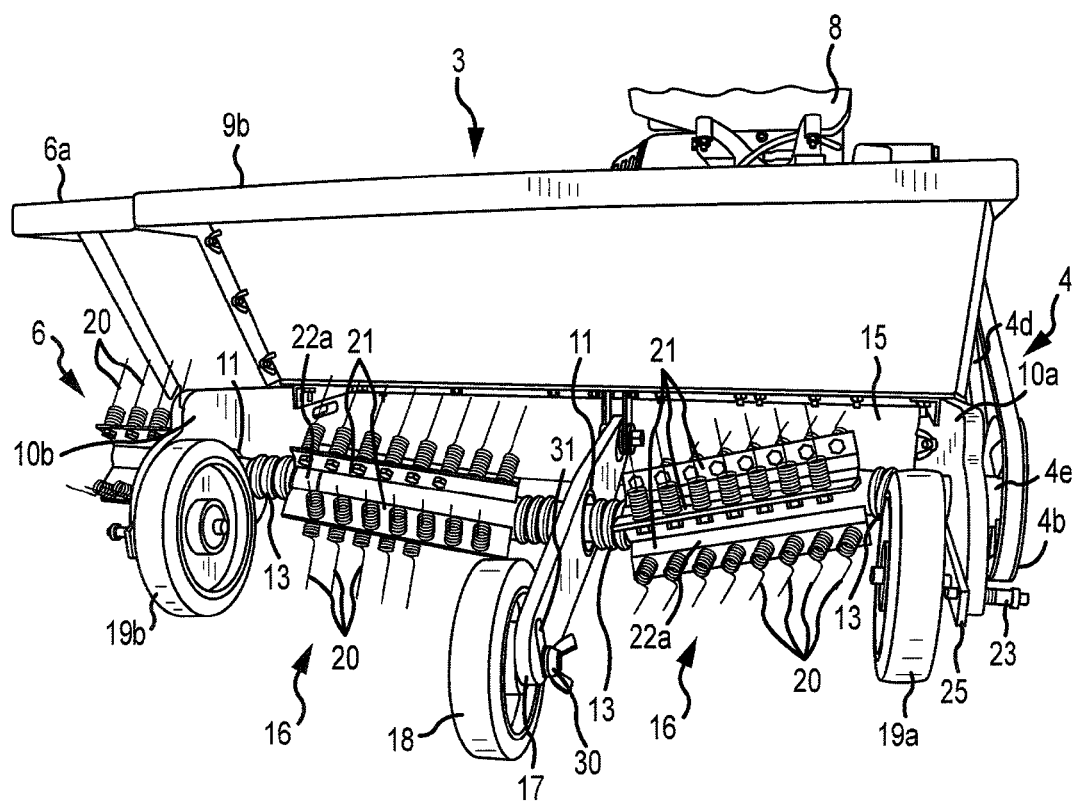
FIG. 9 is a detail perspective view of the flexible thatching assembly of the present invention with the center wheel extended downward relative to the two outer wheels.

FIGS. 7, 8 and 9, respectively, are detail perspective views of the flexible thatching assembly of the present invention with the center wheel extended upward relative to the two outer wheels, with the center wheel on roughly the same horizontal plane as the two outer wheels, and with the center wheel extended downward relative to the two outer wheels. Note that the shafts of the two universal joints 13 located on either side of the guide arm 17 enter into a bearing 11 in roughly the center of the guide arm 17.

Figure 10:
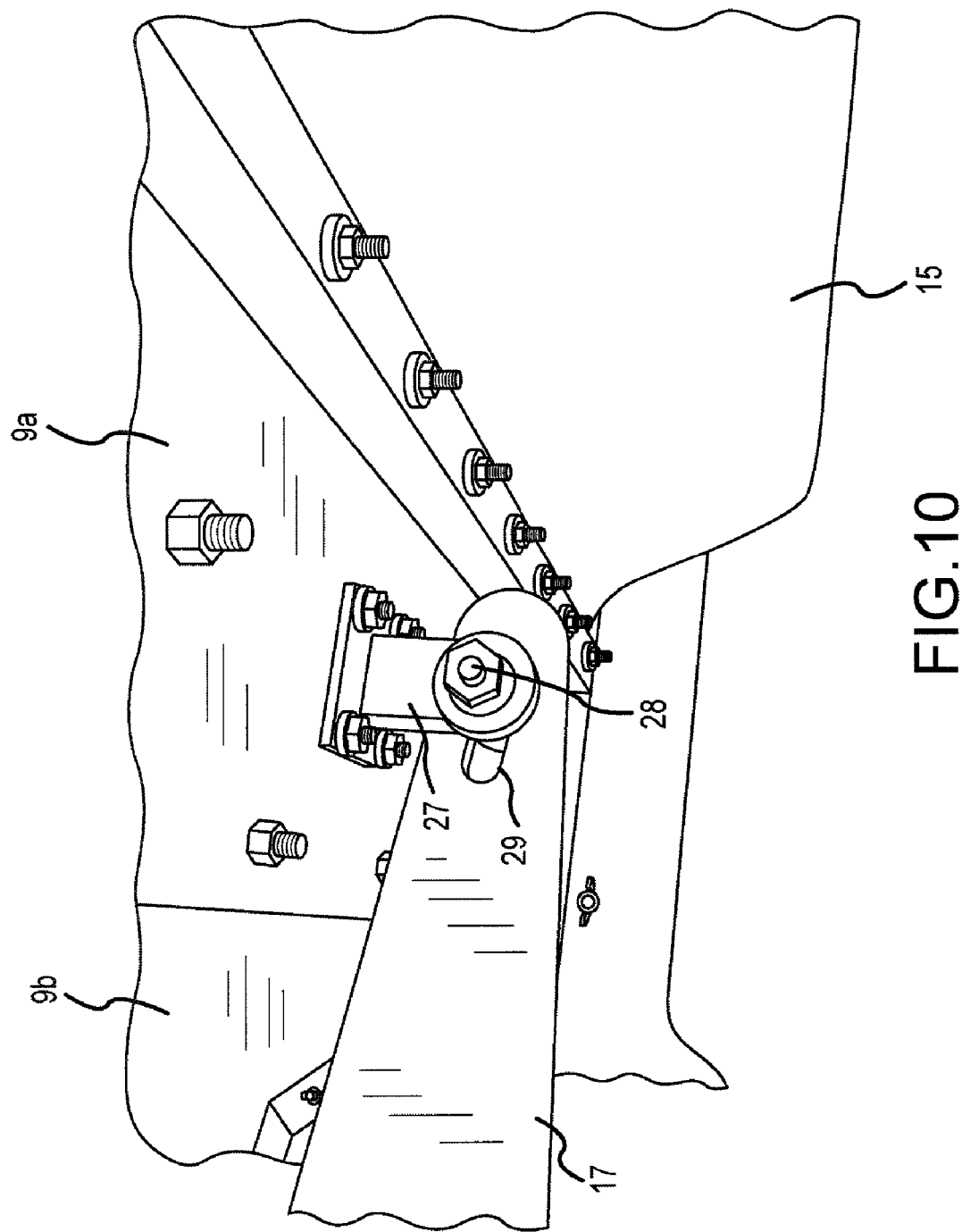
FIG. 10 is a detail perspective view of the guide arm pivot point of the present invention.

As shown in FIG. 10, one end of the guide arm 17 is connected to a support bracket 27 that extends downward from the underside of the flat portion 9a of the top plate 9. The guide arm 17 is preferably connected to the support bracket 27 by a bolt 28 that passes through the support bracket 27 and also through a first slot 29 in the guide arm 18. The first slot 29 allows the guide arm 17 to move laterally as it pivots up and down.

The other end of the guide arm 17 is attached to the center wheel 18, which is free to move up and down as required by the terrain over which the thatch rake is used. For example, if the thatch rake passes over a bump in the ground, then the center wheel 18 would be raised upward. Similarly, if the thatch rake passes over a depression in the ground, then the center wheel 18 would be lowered. (In a preferred embodiment, the combined weight of the center wheel 18 and guide arm 17 forces the thatching assembly 5 downward at all times.) In this manner, the flexible thatching assembly 5, and the pivoting guide arm 17 in particular, allows the thatch rake to operate effectively on uneven terrain.

Two universal joints 13 lie between each thatching rod 16 and the guide arm 17, for a total of four universal joints in the flexible thatching assembly 5. With this configuration, not only the center wheel 18 but also the thatching rods 16 themselves are allowed to pivot upward or downward as the thatch rake encounters uneven terrain. Note that only the two inner universal joints 13 move upward or downward; the two outer universal joints 13 are stationary.

In the embodiment shown in FIGS. 7-9, the two inner universal joints 13 cause a strip of unthatched ground in the center of the thatch rake. This problem could be minimized by designing a universal joint into the two thatching rods 16 such that the area of unthatched ground would only be as wide as the guide arm 17.

In a preferred embodiment, the axle (not shown) of the center wheel 18 extends through a second slot 30 in the guide arm 17 and is secured with a nut 31. The height of the center wheel 18 relative to the guide arm 17 may be adjusted by loosening the nut 31, repositioning the axle within the second slot 30, and retightening the nut 31.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A thatch rake comprising:
 (a) a handle;
 (b) a body assembly comprising two side plates, each having a front end;
 (c) a belt drive system comprising first and second rotating pulley wheels;
 (d) a motor;
 (e) a flexible thatching assembly comprising two thatching rods; and
 (f) a guide arm situated in between the two side plates;
 wherein each thatching rod is situated between a side plate and the guide arm;
 wherein a universal joint is located between each side plate and a thatching rod and between each thatching rod and the guide arm;
 wherein each thatching rod comprises a plurality of outwardly extending tines;
 wherein the guide arm has a front end and a rear end and is pivotally attached to the body assembly on the rear end at a pivot point and attached to a center wheel on the front end; and
 wherein the thatching rods are situated between the pivot point on the body assembly and the center wheel located on the front end of the guide arm.

2. The thatch rake of claim 1, further comprising two outer wheels, each of which is situated inside of one of the two side plates and in front of a thatching rod.

3. The thatch rake of claim 2, wherein the height of each outer wheel is adjustable by repositioning the outer wheel relative to the side plate.

4. The thatch rake of claim 1, wherein the height of the center wheel relative to the wide arm is adjustable.

5. The thatch rake of claim 1, wherein each thatching rod is at an angle of roughly one hundred eight degrees relative to the front end of the side plate and roughly seventy-two degrees relative to the front end of the guide arm.

6. The thatch rake of claim 3, wherein each thatching rod is at an angle in the range of ninety to one hundred thirty-five degrees relative to the front end of the side plate and in the range of forty-five to ninety degrees relative to the front end of the guide arm.

7. The thatch rake of claim 1, wherein the second pulley wheel comprises an axle that passes through a bearing in one of the two side plates and is connected to the universal joint that is situated between the side plate through which the axle passes and the thatching rod that is situated between the guide arm and the side plate through which the axle passes.

8. The thatch rake of claim 1, further comprising an edge thatching attachment that is removably attached to the outside of one of the two side plates such that the edge thatching attachment is at a ninety (90)-degree angle relative to the outside of the side plate, and comprising a plurality of outwardly extending tines.

9. The thatch rake of claim 8, wherein the edge thatching attachment further comprises a steel pipe that slides over a steel rod that extends through a bearing in the side plate outside of which side plate the edge thatching attachment is situated and is connected to the universal joint that is situated between the side plate outside of which side plate the edge thatching attachment is situated and the thatching rod that is situated between the guide arm and the side plate outside of which side plate the edge thatching attachment is situated.

10. The thatch rake of claim 1, wherein the center wheel comprises an axle that extends through a slot in the guide arm.

* * * * *

UNITED STATES PATENT AND TRADEMARK OFFICE
CERTIFICATE OF CORRECTION

| | | |
|---|---|---|
| PATENT NO. | : 8,141,651 B1 | Page 1 of 1 |
| APPLICATION NO. | : 13/029241 | |
| DATED | : March 27, 2012 | |
| INVENTOR(S) | : Michael J. Christianson et al. | |

It is certified that error appears in the above-identified patent and that said Letters Patent is hereby corrected as shown below:

Title page, item [74], the name of the Attorney, Agent, or Firm appears as Antoinett M. Tease. The correct spelling of the Attorney's first name is Antoinette.

Signed and Sealed this

Twenty-seventh Day of November, 2012

David J. Kappos
*Director of the United States Patent and Trademark Office*